US009819232B2

United States Patent
Patino et al.

(10) Patent No.: US 9,819,232 B2
(45) Date of Patent: Nov. 14, 2017

(54) ENERGY TRANSFER OPTIMIZATION BY DETECTING AND MITIGATING MAGNETIC SATURATION IN WIRELESS CHARGING WITH FOREIGN OBJECT DETECTION

(71) Applicant: BlackBerry Limited, Waterloo (CA)

(72) Inventors: Joseph Patino, Miramar, FL (US); Soniya Noormuhamed Thekkevalappil, Cupertino, CA (US); Salvador Sibecas, Lake Worth, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/188,692

(22) Filed: Jun. 21, 2016

(65) Prior Publication Data

US 2016/0301262 A1    Oct. 13, 2016

Related U.S. Application Data

(63) Continuation of application No. 14/073,345, filed on Nov. 6, 2013, now Pat. No. 9,391,470.

(51) Int. Cl.
*H02J 7/00* (2006.01)
*H02J 50/70* (2016.01)
(Continued)

(52) U.S. Cl.
CPC ............. *H02J 50/70* (2016.02); *H02J 7/025* (2013.01); *H02J 7/045* (2013.01); *H02J 17/00* (2013.01); *H02J 50/12* (2016.02); *H02J 50/60* (2016.02)

(58) Field of Classification Search
CPC .................. H02J 50/70; H02J 7/025
(Continued)

(56) References Cited

U.S. PATENT DOCUMENTS 9,391,470 B2 *  7/2016  Patino .............. H02J 7/025
                                              320/108
2011/0199046 A1  8/2011  Tsai et al.
(Continued)

FOREIGN PATENT DOCUMENTS

WO    2012037279 A1    3/2012
WO    2012040548 A1    3/2012
(Continued)

OTHER PUBLICATIONS

European Extended Search Report; Application No. 14859548.1; dated Jun. 13, 2017; 10 pages.
(Continued)

*Primary Examiner* — Suchin Parihar
(74) *Attorney, Agent, or Firm* — Conley Rose, P.C.; J. Robert Brown, Jr.

(57) ABSTRACT

A method is provided for optimizing wireless charging of a mobile device by a wireless charger. The method comprises determining whether magnetic saturation occurred in at least one of the mobile device and the wireless charger during a first wireless transmission of power from the wireless charger to the mobile device; and, when magnetic saturation is determined to have occurred, successively reducing transmit power in the wireless charger until reaching an operating wireless transmit power, wherein neither the mobile device nor the wireless charger is in magnetic saturation at the operating wireless transmit power.

20 Claims, 7 Drawing Sheets

(51) Int. Cl.
*H02J 7/02* (2016.01)
*H02J 17/00* (2006.01)
*H02J 50/60* (2016.01)
*H02J 50/12* (2016.01)
*H02J 7/04* (2006.01)

(58) Field of Classification Search
USPC .......................................................... 320/108
See application file for complete search history.

(56) References Cited

U.S. PATENT DOCUMENTS

| | | |
|---|---|---|
| 2011/0285214 A1 | 11/2011 | Stevens et al. |
| 2012/0013198 A1 | 1/2012 | Uramoto et al. |
| 2013/0175876 A1 | 7/2013 | Kiyota |
| 2013/0181724 A1* | 7/2013 | Teggatz .............. G01N 27/02 324/629 |
| 2013/0241300 A1 | 9/2013 | Miyamoto |
| 2013/0307468 A1 | 11/2013 | Lee et al. |
| 2014/0125276 A1 | 5/2014 | Lampien |
| 2014/0306656 A1 | 10/2014 | Tabata et al. |
| 2015/0097442 A1* | 4/2015 | Muurinen ........... H04B 5/0037 307/104 |

FOREIGN PATENT DOCUMENTS

| | | |
|---|---|---|
| WO | 2012099965 A2 | 7/2012 |
| WO | 2013086064 A1 | 6/2013 |

OTHER PUBLICATIONS

Wikipedia; "Saturation (Magnetic)"; http://en.wikipedia.org/wiki/Saturation_(magnetic); Dec. 15, 2005; 2 pages.
Wireless Power Consortium; "System Description, Wireless Power Transfer, vol. I: Low Power, Part 1: Interface Definition"; Version 1.1; Mar. 2012; 128 pages.
Wireless Power Consortium; "System Description, Wireless Power Transfer, vol. I: Low Power, Part 1: Interface Definition"; Version 1.1.2; Jun. 2013; 186 pages.
Office Action dated Nov. 5, 2015; U.S. Appl. No. 14/073,345, filed Nov. 6, 2013; 13 pages.
Notice of Allowance dated Mar. 11, 2016; U.S. Appl. No. 14/073,345, filed Nov. 6, 2013; 10 pages.
PCT International Search Report; Application No. PCT/US2014/064147; dated Mar. 15, 2015; 4 pages.
PCT Written Opinion of the International Searching Authority; Application No. PCT/US2014/064147; dated Mar. 15, 2015; 5 pages.

* cited by examiner

US 9,819,232 B2

ENERGY TRANSFER OPTIMIZATION BY DETECTING AND MITIGATING MAGNETIC SATURATION IN WIRELESS CHARGING WITH FOREIGN OBJECT DETECTION

CROSS-REFERENCE TO RELATED APPLICATIONS

This application is a continuation of U.S. patent application Ser. No. 14/073,345 filed Nov. 6, 2013 by Joseph Patino, et al. entitled, "Energy Transfer Optimization by Detecting and Mitigating Magnetic Saturation in Wireless Charging with Foreign Object Detection", which is incorporated herein by reference as if reproduced in its entirety.

FIELD OF THE DISCLOSURE

The present disclosure relates to wireless charging and more particularly to optimization of energy transfer in wireless charging systems by detecting and mitigating magnetic saturation while also performing foreign object detection.

BACKGROUND

In a wireless charging system, a first device may electrically charge a second device without a wired electrical connection between the two devices. For example, when the first device detects the presence of the second device, a coil in the first device may be electromagnetically energized. The electromagnetic energy from the first device may, for example, energize a coil in the second device, thus inducing an electrical current in the coil in the second device. The electromagnetic energy in the coil in the second device may then be used to charge an electric storage component, such as a battery, in the second device. Efficient transfer of energy from the first device to the second device is a goal of wireless charging systems.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A wireless charging system may comprise a wireless charger (sometimes referred to as a base station) and a device that is being charged. Wireless charging may be complicated by magnetic saturation in either the wireless charger or the device, which reduces the efficiency of energy transfer. The presence of a foreign object also complicates wireless charging because of a desire to avoid heating foreign objects during charging. There is thus a need to detect and mitigate magnetic saturation as well as detect foreign objects on or near the wireless charger or device during wireless charging.

Embodiments of the present disclosure provide a procedure for determining if a power loss detected during wireless charging of a device is due to a foreign object on the charging base station or to magnetic saturation in a reception coil of the device. In addition, when it is determined that a power loss is due to magnetic saturation, a procedure is provided for decreasing the current in a transmission coil of the base station so that magnetic saturation no longer occurs and so that a transmission current appropriate for the characteristics of the reception coil in the device is maintained.

Figure 1:
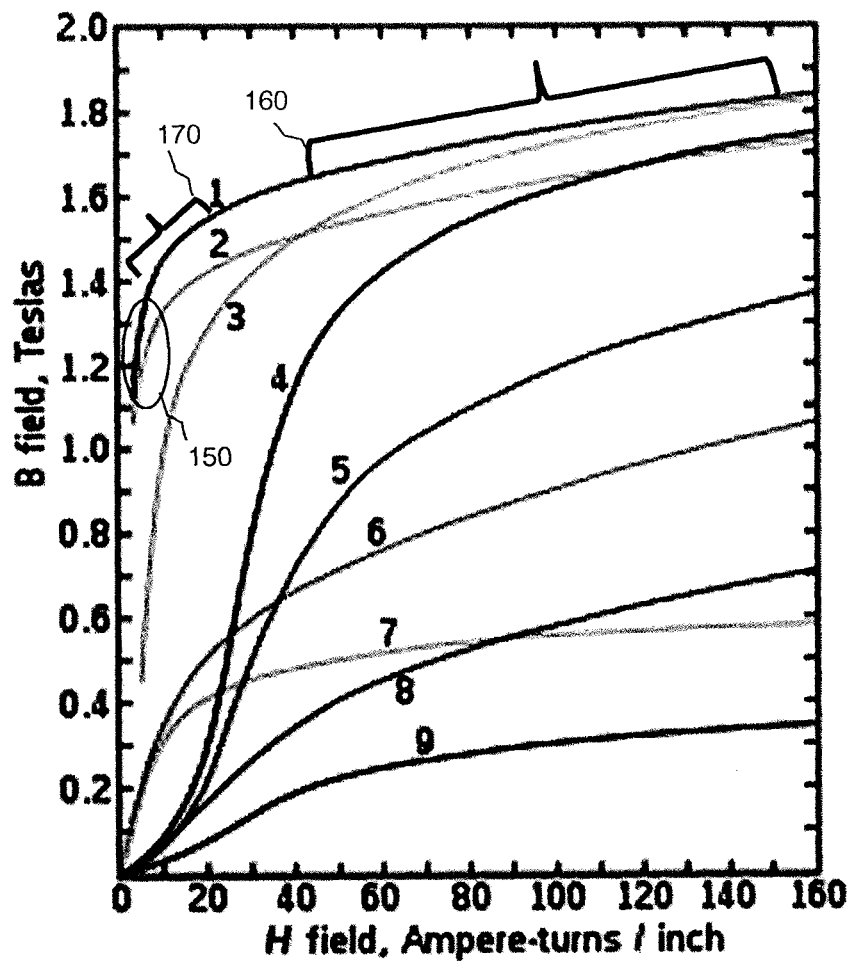
FIG. 1 illustrates magnetization curves for several materials.

Magnetic saturation is a state reached when an increase in an applied external magnetic field H (or "H field") cannot materially increase the magnetization of a material further, so the total magnetic flux density B (or "B field") levels off. Magnetic saturation is a characteristic particularly of ferromagnetic materials, such as iron, nickel, cobalt, and their alloys. Saturation may be seen in a magnetization curve (also called BH curve or hysteresis curve) of a substance, as a bending to the right of the curve, as can be seen in FIG. 1. As the H field increases, the B field may asymptotically approach a maximum value, which may be referred to as a saturation level for the substance. Above saturation, the B field continues increasing, but at the paramagnetic rate, which may be three orders of magnitude smaller than the ferromagnetic rate seen below saturation.

In FIG. 1, three portions of curve number 1 may be identified. A first portion may be referred to as the non-saturation region 150. In the non-saturation region 150, an increase in magnetic field H results in an approximately equivalent increase in magnetic flux density B. A second portion may be referred to as the saturation region 160. In the saturation region 160, the material is magnetically saturated, and an increase in H results in little or no increase in B. A third portion may be referred to as a knee region 170. In the knee region 170, a transition between the non-saturation region 150 and the saturation region 160 occurs. Similar regions may exist in the magnetization curves for other materials.

Figure 2:
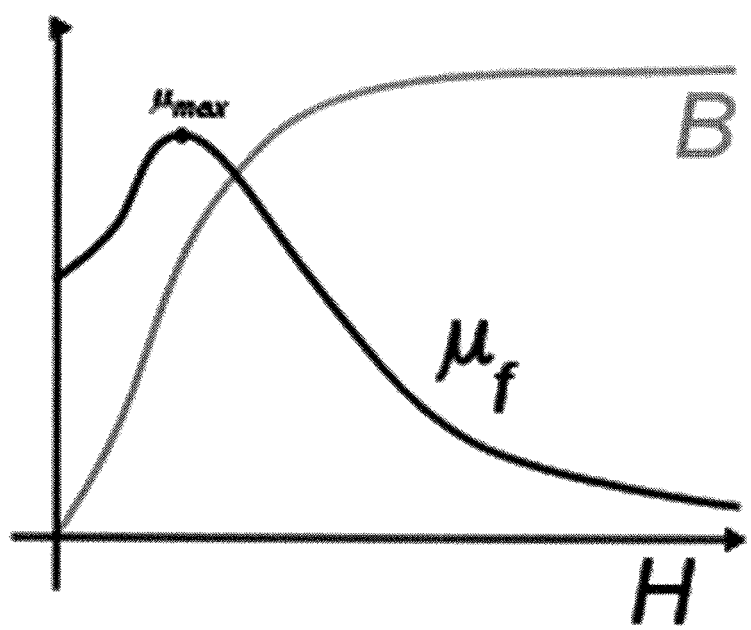
FIG. 2 is a graph of a magnetic field and a magnetic permeability in a magnetizing filed.

The relation between the magnetizing field H and the magnetic field B can also be expressed as the magnetic permeability, $\mu=B/H$, or the relative permeability, $\mu_r=\mu/\mu_0$, where $\mu_0$ is the vacuum permeability. The permeability of ferromagnetic materials is not constant, but depends on H. In a saturable material, the relative permeability increases with H to a maximum, and then, as the material approaches saturation, the relative permeability inverts and decreases toward one. This behavior is illustrated in FIG. 2 where, due to saturation, the magnetic permeability $\mu_r$ of a ferromagnetic substance may reach a maximum and then decline.

Different materials have different saturation levels. For example, high permeability iron alloys used in transformers reach magnetic saturation at or near 1.6-2.2 teslas (T), whereas ferrites may saturate in the range 0.2-0.5 T. Some amorphous alloys saturate in the range 1.2-1.3 T.

Ferromagnetic materials like iron that show saturation may comprise microscopic regions called magnetic domains that act like tiny permanent magnets that can change their direction of magnetization. Before an external magnetic field is applied to the material, the domains are oriented in random directions. Their tiny magnetic fields point in random directions and cancel each other out, so the material may have little to no overall net magnetic field. When an external magnetizing field H is applied to the material, the field penetrates the material and aligns the domains, causing their tiny magnetic fields to turn, align parallel to the external field, and add together to create a large magnetic field B which extends out from the material. This result may be referred to magnetization. The stronger the external magnetic field, the more the domains align. Saturation occurs when practically all the domains are lined up, so further increases in the applied field cannot cause further alignment of the domains.

Saturation limits the maximum magnetic fields achievable in ferromagnetic-core electromagnets and transformers to about 2 T, which may put a limit on the minimum size of their cores. This limit is one reason why high-power motors, generators, and utility transformers may be physically large—large magnetic cores may be desirable.

In electronic circuits, transformers and inductors with ferromagnetic cores may operate nonlinearly when the current through them is large enough to drive their core materials into saturation. This means that their inductance and other properties may vary with changes in drive current. In linear circuits, this outcome may be considered an unwanted departure from ideal behavior. When alternating current (AC) signals are applied, this nonlinearity can cause the generation of harmonics and intermodulation distortion. To prevent this result, the level of signals applied to iron core inductors may need to be limited so the inductors do not saturate. To lower the effects of saturation, an air gap may be created in some kinds of transformer cores. The saturation current, or the current through the winding that may saturate the magnetic core, may be given by manufacturers in the specifications for many inductors and transformers.

On the other hand, saturation is exploited in some electronic devices. Saturation is employed to limit current in saturable-core transformers that are used in arc welding and in ferroresonant transformers that serve as voltage regulators. When the primary current exceeds a certain value, the core may be pushed into its saturation region, limiting further increases in secondary current. In a more sophisticated application, saturable-core inductors and magnetic amplifiers may use a direct current (DC) current through a separate winding to control an inductor's impedance. Varying the current in the control winding moves the operating point up and down in the saturation curve, controlling the AC current through the inductor. Such concepts may be used in variable fluorescent light ballasts and power control systems.

Figure 3:
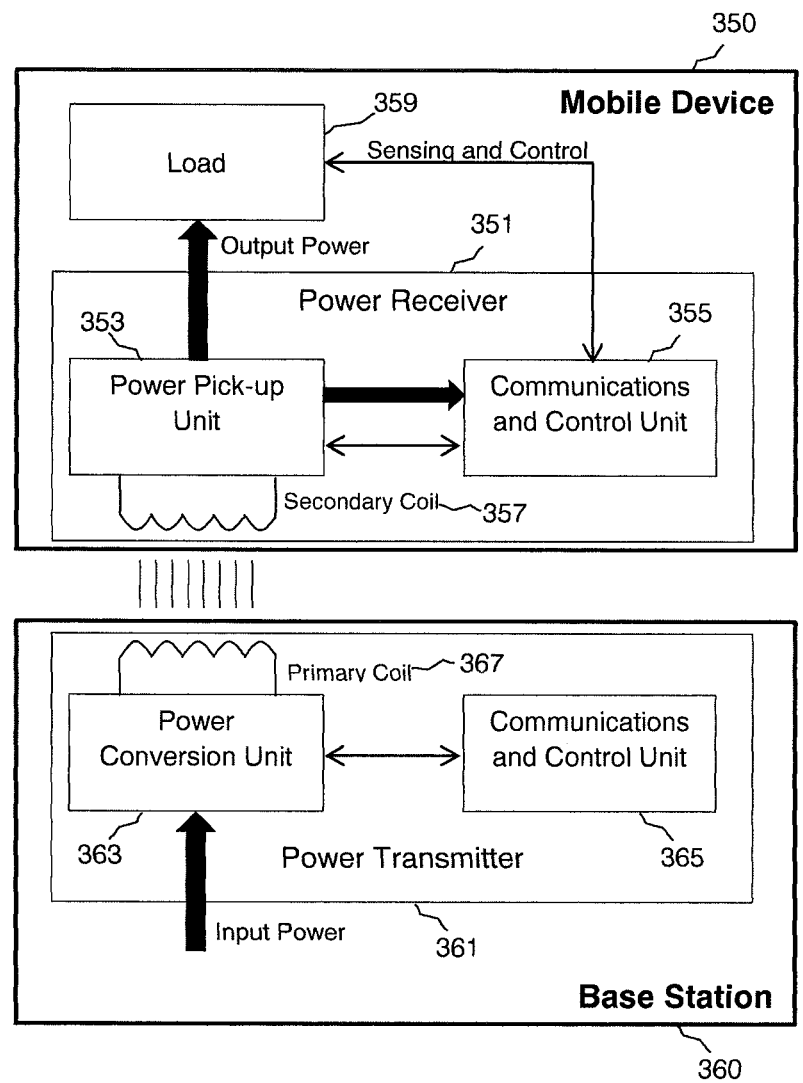
FIG. 3 is a diagram of an wireless charging system.

In a wireless charger, energy may be transferred via a magnetic field from a primary coil in a charging component to a secondary coil in a component being charged. Such charging may be referred to as inductive wireless charging. FIG. 3 illustrates a mobile device 350 configured to be charged by a base station 360 via inductive wireless charging. The mobile device 350 may be a cell phone, a smart phone, a handheld computer, or any other easily transportable device capable of being inductively wirelessly charged. Any such component may be referred to herein as a device or a mobile device. The base station 360 may have a flat, horizontal surface on which the mobile device 350 can be placed for charging. The base station 360 may be capable of being plugged in to a standard wall outlet and may be left in a particular location for an extended period of time. Alternatively, as described in more detail below, there are situations where a mobile device may wirelessly charge another mobile device and thus operate analogously to a base station. A base station may also be referred to herein as a device.

The mobile device 350 may include a power receiver 351 that includes a power pick-up unit 353 and a communications and control unit 355. The power pick-up unit 353 may include a secondary coil 357, which may also be referred to herein as a reception coil. The communications and control unit 355 may include hardware and/or software involved in managing the wireless charging procedure. The base station 360 may include a power transmitter 361 that includes a power conversion unit 363 and a communications and control unit 365. The power conversion unit 363 may include a primary coil 367, which may also be referred to herein as a transmission coil.

The communications and control unit 365 may include hardware and/or software involved in managing the wireless charging procedure. The communications and control unit 365 may comprise a processor, which may be implemented as one or more central processing unit (CPU) chips, cores (e.g., a multi-core processor), field-programmable gate arrays (FPGAs), application specific integrated circuits (ASICs), and/or digital signal processors (DSPs). While only one power transmitter 361 is shown in FIG. 3, a plurality of power transmitters 361 may be present in one base station 360. The communications and control unit 365 may also comprise a memory communicatively coupled to the processor. The memory may comprise a secondary storage, read only memory (ROM), random access memory (RAM), any other suitable data storage device as would be appreciated by one of ordinary skill in the art upon viewing this disclosure, or combination thereof. Secondary storage may comprise of one or more disk drives, solid state drives, or tape drives and is used for non-volatile storage of data and as an over-flow data storage device if a RAM is not large enough to hold all working data. The secondary storage may be used to store programs that are loaded into a RAM when such programs are selected for execution. A ROM may be used to store instructions and perhaps data that are read during program execution. The ROM may be a non-volatile memory device that typically has a small memory capacity relative to the larger memory capacity of a secondary storage. The RAM may be used to store volatile data and perhaps to store instructions. Access to both the ROM and the RAM is typically faster than to the secondary storage. In an embodiment, instructions to be executed by the aforementioned processor may be stored in the memory.

When the base station 360 detects the presence of the mobile device 350, the power conversion unit 363 may provide power to the primary coil 367, thus generating a magnetic field. The magnetic field may be picked up by the secondary coil 357, which converts the magnetic field into electrical current. The power pick-up unit 353 may then provide electrical power to a load 359 in the mobile device 350.

When a foreign object, made of certain materials, is placed in close proximity to the transmitter and/or receiver during charging, the foreign object may absorb some of the energy, resulting in a power loss in the reception coil. If the power loss is greater than a power loss threshold, power to the transmission coil may be disabled to prevent heating the foreign object. Existing wireless chargers have simple algorithms to detect foreign objects. For example, in accordance with the Wireless Power Consortium (WPC) specifications, if the power received is less than the power transmitted by a fixed value (for example 0.25 watts), then transmission is stopped.

Figure 4:
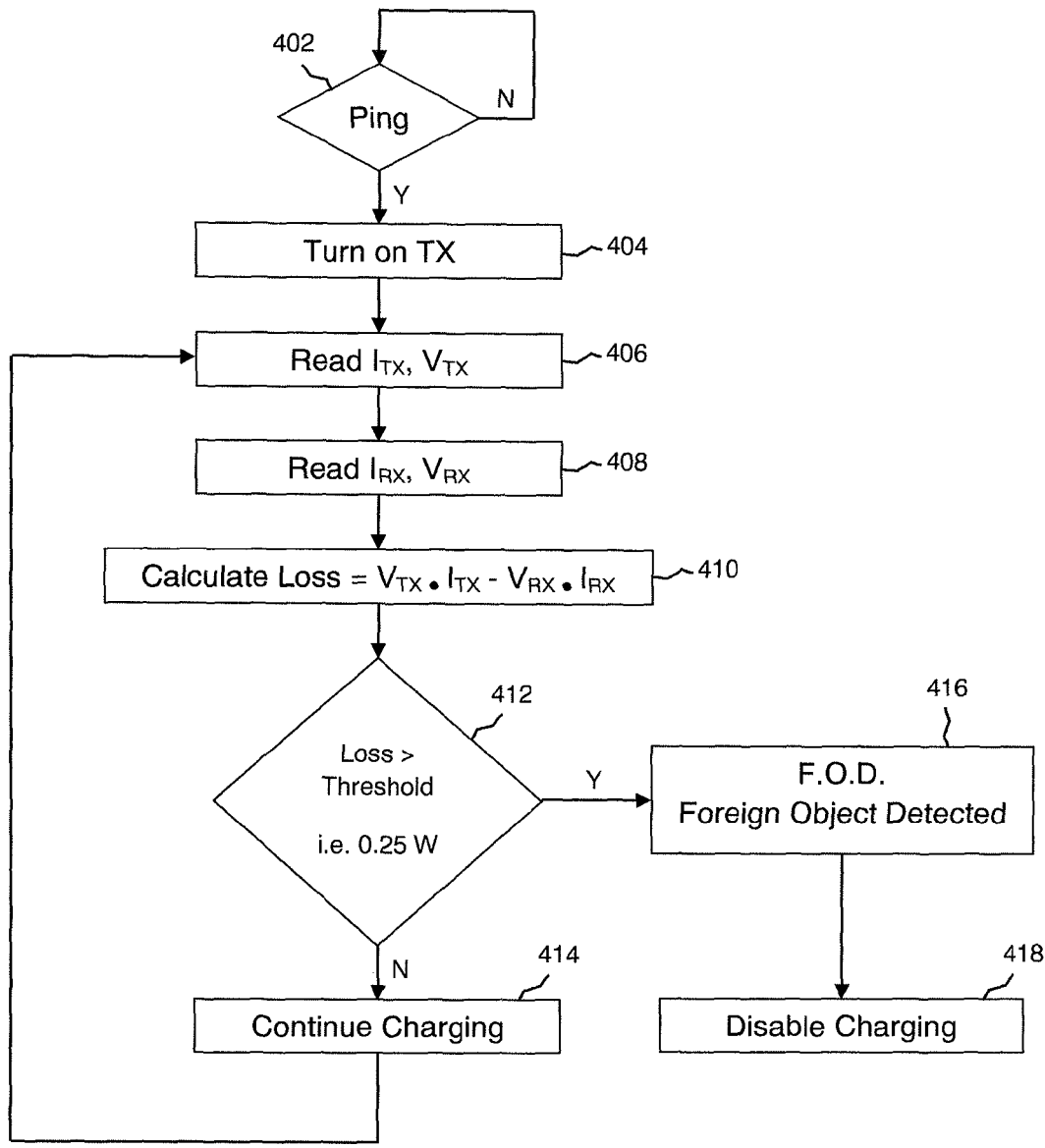
FIG. 4 is a flowchart of a procedure for detecting a foreign object in a wireless charging system.

More specifically, the procedure illustrated in FIG. 4 has been suggested for detecting a foreign object on a wireless charging base station. In the following discussion of the procedure illustrated in FIG. 4, it is assumed that a base station, such as the base station 360, is charging a mobile device, such as the mobile device 350, but the procedure may also apply to a scenario where one mobile device is charging another mobile device.

At block 402, the base station periodically pings to detect if a device capable of being wirelessly charged is present on the base station. If such a device is detected, then at block 404, the base station turns on its transmitter. At block 406, the base station measures its transmission voltage and its transmission current and multiplies the two values together to derive its transmission power (power is proportional to voltage time current). For example, the base station 360 may measure voltage across the primary coil 367 and current in the primary coil 367 and use these values to determine transmission power. Alternatively, the base station may determine its transmission power in some other manner. At block 408, the base station determines the reception current and reception voltage at the device. These values may be measured by the device and provided to the base station by the device. For example, the mobile device 350 as illustrated in FIG. 3 may measure voltage in the secondary coil 357 and current in the secondary coil 357. The base station may then multiply the reception current and reception voltage together to determine the reception power at the device. Alternatively, the base station may determine the reception power in some other manner. The calculations may be performed in a communications and control unit, such as the communications and control unit 365 in the base station 360.

At block 410, the base station calculates the power loss by subtracting the reception power from the transmission power. At block 412, the base station determines if the power loss is greater than a threshold, such as 0.25 watts. If the power loss is not greater than the threshold, then at block 414, the base station continues charging the device. The procedure then returns to block 406, and the base station again determines the transmission power and reception power, calculates the power loss, and compares the power loss to the threshold. If, at block 412, the base station determines that the power loss is greater than the threshold, then at block 416, the base station establishes that a foreign object has been detected on the base station. At block 418, the base station then disables charging of the device to prevent heating the foreign object.

The WPC specification System Description Wireless Power Transfer, Volume 1: Low Power, Part 1: Interface Definition, Annex D, Foreign Object Detection (Normative) describes the reporting of received power by a power receiver:

In order to enable a Power Transmitter to monitor the power loss across the interface as one of the possible methods to limit the temperature rise of Foreign Objects, a Power Receiver shall report its Received Power to the Power Transmitter.

The Received Power (PO indicates the total amount of power that is dissipated within the Mobile Device due to the magnetic field produced by the Power Transmitter. The Received Power equals the power that is available from the output of the Power Receiver plus any power that is lost in producing that output power. For example, the power loss includes (but is not limited to) the power loss in the Secondary Coil and series resonant capacitor, the power loss in the Shielding of the Power Receiver, the power loss in the rectifier, the power loss in any post-regulation stage, and the eddy current loss in metal components or contacts within the Power Receiver.

This version 1.1.2 of the System Description Wireless Power Transfer, Volume I, Part 1, does not define any specific method for a Power Receiver to determine the Received Power—but as an example, the Power Receiver could measure the net power provided at its output, and add estimates of any applicable power loss.

A Power Receiver shall report its Received Power ($P_{received}$) in a Received Power Packet such that ($P_{received}-250$ mW$\leq P_{pr} \leq P_{received}$). (Informative) This means that the reported Received Power is an overestimate of the actual Received Power by at most 250 mW. In particular, this implies that the reported Received Power is greater than or equal to the Transmitted Power in the case that there is no Foreign Object present on the Interface Surface—because in the latter case, the Received Power equals the Transmitted Power—and as a result, a Power Transmitter is less likely to falsely detect a Foreign Object.

A drawback of this solution is that it may neglect to consider that factors other than the presence of a foreign object may cause power loss. For example, power loss incurred by driving one of the coils into magnetic saturation may also cause the power loss threshold to be exceeded. Magnetic saturation can occur in either the transmission coil or the reception coil and can put the system in a situation where the transmitter is sending more power than can be received. For the simple, fixed-loss algorithm of FIG. 4, the charger may halt in the case where no foreign object is present but the power loss exceeds the threshold because the transmission coil or reception coil is saturated.

It may be desirable to determine whether a power loss is due to the presence of a foreign object or due to magnetic saturation of a coil. If the power loss is due to a foreign object, then charging may be disabled in order to avoid heating the foreign object. In an embodiment, if the power loss is due to magnetic saturation, then the charging current in the transmission coil may be reduced until an optimal power transfer rate is achieved.

Figure 5:
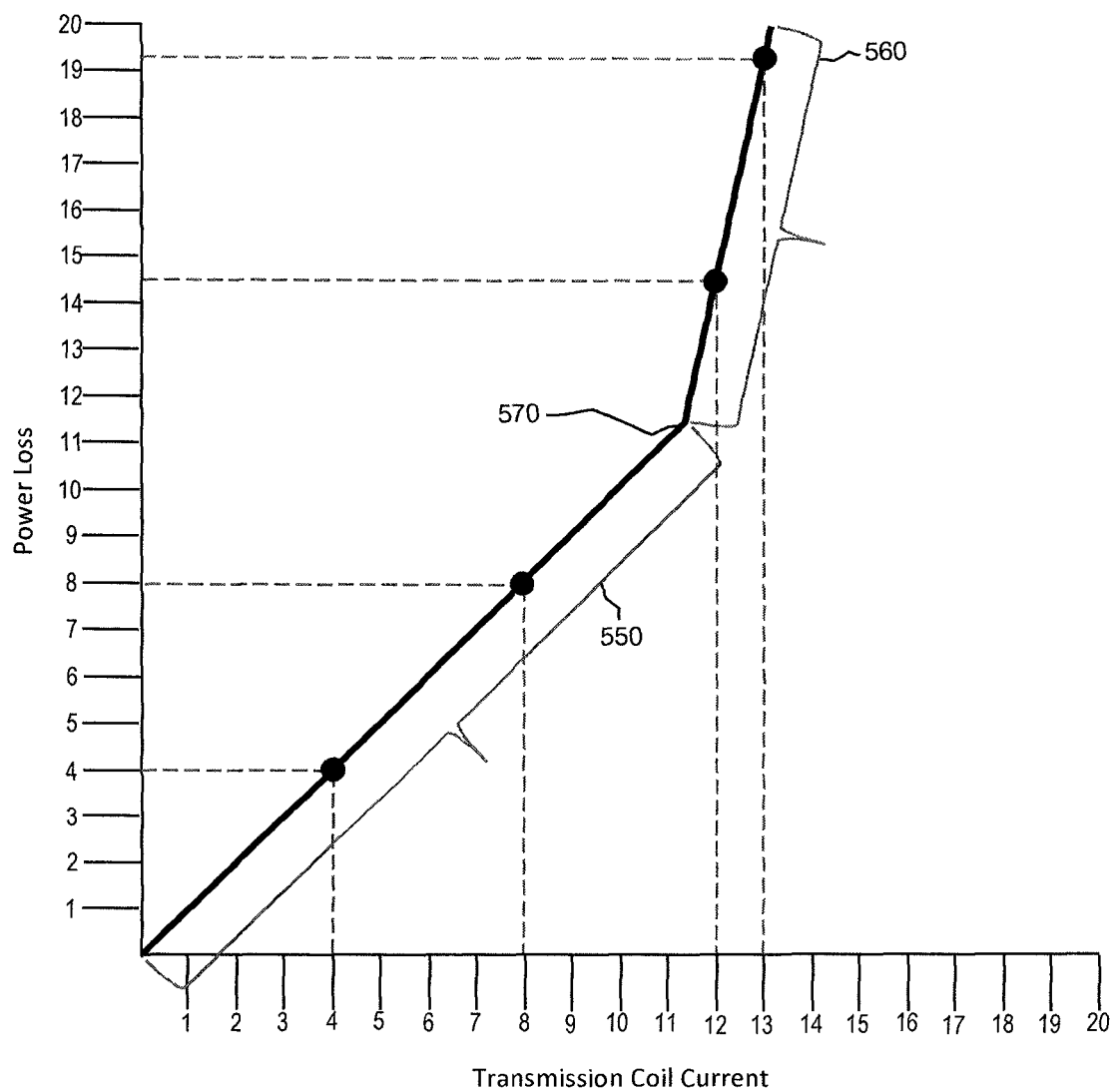
FIG. 5 is an idealized graph of a relationship between transmission coil current and power loss.

FIG. 5 illustrates an idealized graph of a relationship between transmission coil current and power loss. It should be understood that FIG. 5 is intended merely as an example to aid in the following discussion. The curve shown may not depict an actual relationship between transmission coil current and power loss, and the values shown for transmission coil current and power loss are in arbitrary units that may not depict actual values.

A non-saturation region 550, a saturation region 560, and a knee 570 may be analogous to the non-saturation region 150, the saturation region 160, and the knee 170 of FIG. 1. In the non-saturation region 550, there may be a linear relationship between transmission coil current and power loss. That is, an increase in transmission coil current of a particular percentage results in an increase in power loss of approximately the same percentage. For example, in this idealized graph, if the transmission coil current is doubled from 4 units to 8 units, the power loss is also doubled from 4 units to 8 units. The non-saturation region 550 depicts the relationship between transmission coil current and power loss that may be expected during typical wireless charging.

At the knee 570, a transition occurs between the non-saturation region 550 and the saturation region 560. It should be understood that the knee 570 is not necessarily a single point as shown but may be a region of gradual transition between the non-saturation region 550 and the saturation region 560.

In the saturation region 560, there is much more pronounced power loss. That is, an increase in transmission coil current of a particular percentage results in a much greater percentage increase in power loss as compared with the non-saturation region 550. For example, in this idealized graph, if the transmission coil current is increased from 12 units to 13 units, the power loss is increased from approximately 14.5 units to approximately 19.5 units. The saturation region 560 is shown as a straight line for illustrative purposes, but as discussed previously the loss in the saturation region may be typically non-linear. That is, changes in power loss in the non-linear region may not be proportional to changes in current.

In an embodiment, the transmission coil current and power loss characteristics discussed above may be used in a procedure for determining if a power loss detected during the inductive wireless charging of a device is due to a foreign object on the charging base station or to magnetic saturation in a transmission coil or a reception coil. In addition, in an embodiment, when it is determined that a power loss is due to magnetic saturation, a procedure is provided for decreasing the current in the transmission coil so that magnetic saturation no longer occurs and a charging current appropriate for the characteristics of the transmission coil and/or the reception coil is maintained.

In an embodiment, transmission coil current and power loss calculations are performed during the charging cycle. However, instead of simply turning off the transmission coil current when the power loss is above a threshold, the transmission coil current is reduced. It is then determined whether the percentage difference of the new transmission coil current as compared to the previous transmission coil current is equal to the percentage difference between the new power loss and the previous power loss. If the two percentages are approximately equal, then the power loss is determined to be due to the presence of a foreign object, and charging is disabled. If the two percentages are not approximately equal, then the power loss is determined to be due to magnetic saturation. In this case, the transmission current is incrementally reduced until it is determined that magnetic saturation is no longer occurring. As used herein, the term "equal" may refer to a relationship wherein two values are within a predefined margin of error of one another.

The above procedure may be performed by a base station charging a mobile device or by a mobile device charging another mobile device. The hardware and/or software for performing the procedure may reside in the device providing the charge, in the device being charged, or partially in one of the devices and partially in the other. There may be an exchange of information between the two devices in order to carry out the procedure. For example, a device being charged may provide its power consumption information to the device providing the charge.

Such a procedure may be valuable to mobile device manufacturers because the manufacturers do not control the transmission coils in the field and have no way of knowing the characteristics of the base stations that may be produced in the future. Thus, there may be no way to determine the transmission side coil's magnetic saturation characteristics. Therefore, an algorithm that takes the magnetic saturation of the coils into account while still maximizing the charge current may be desirable.

In some cases, a power loss may be due to both magnetic saturation and the presence of a foreign object. In such a case, it may be undesirable to simply reduce the transmission current until magnetic saturation is no longer occurring and then maintain the transmission current at that level. Doing so may set the transmission current at a level that causes heating of the foreign object, which is not WPC-compliant. Therefore, in an embodiment, after it has been established that magnetic saturation is no longer occurring, it is determined whether the power loss still exceeds the threshold. If the threshold is still exceeded, it is established that a foreign object is present and charging is disabled. If the threshold is not exceeded, the transmission current is maintained at the level to which it was most recently reduced.

Figure 6:
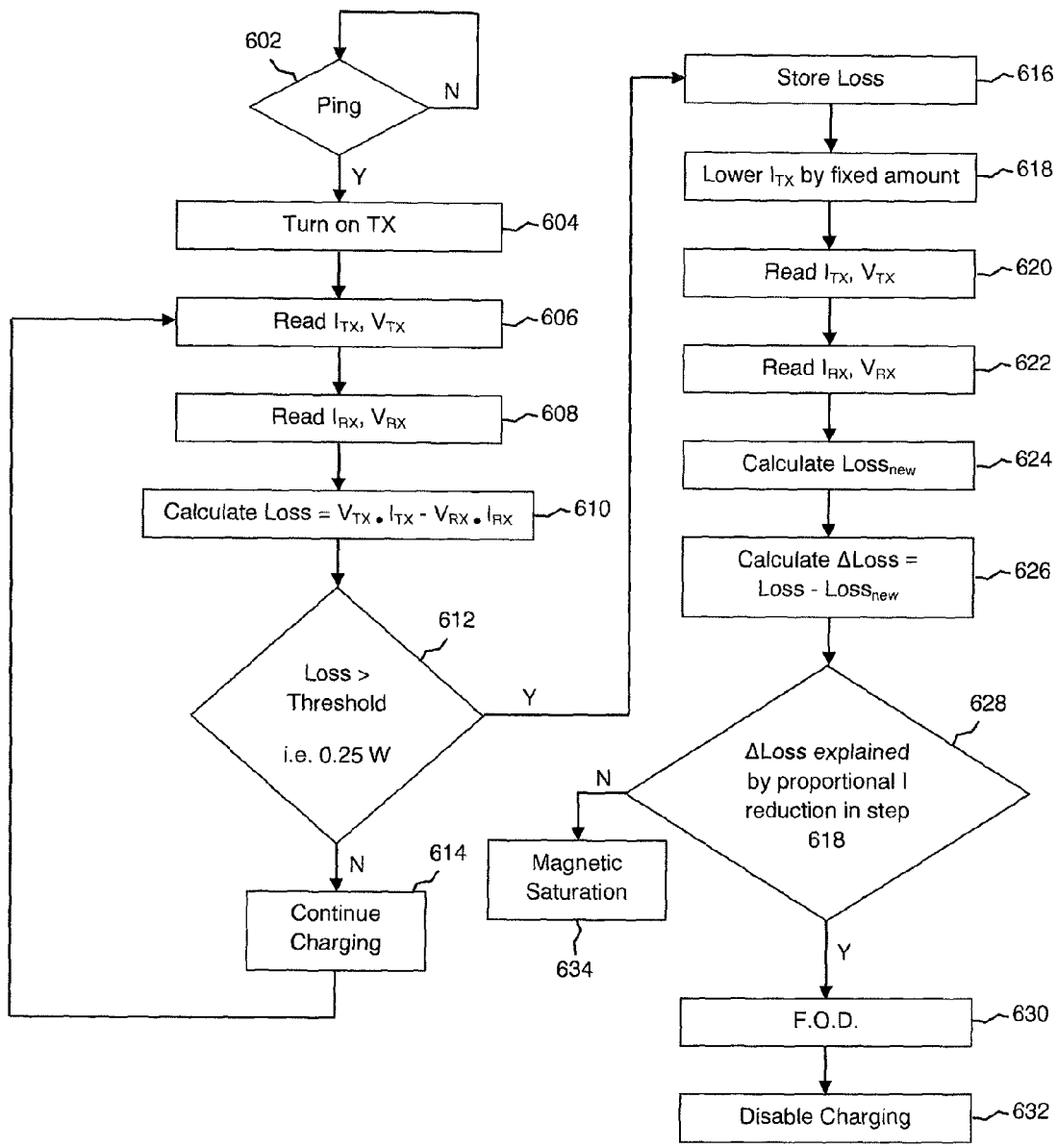
FIG. 6 is a flowchart of a procedure for determining if magnetic saturation has occurred in a wireless charging system, according to an embodiment of the disclosure.

FIG. 6 illustrates an embodiment of a procedure for determining if a power loss is due to magnetic saturation. The steps taken in blocks 602 through 614 are similar to the steps taken in blocks 402 through 414 of FIG. 4, so the steps taken in blocks 602 through 614 are not described here for conciseness. As with FIG. 4, in the following discussion of the procedure illustrated in FIG. 6, it is assumed that a base station, such as the base station 360, is charging a mobile device, such as the mobile device 350, but the procedure may also apply to a scenario where one mobile device is charging another mobile device.

If, at block 612, it is determined that the power loss is greater than a threshold, a series of steps are taken to determine whether the power loss is due to the presence of a foreign object on a base station or due to magnetic saturation in the transmission coil, such as the primary coil 367, or the reception coil, such as the secondary coil 357. At block 616, the power loss that was calculated at block 610 is stored. At block 618, the current in the transmission coil may be decreased by a fixed amount, corresponding to a fixed percentage. For example, the current in the transmission coil may be reduced by a particular percentage such that the new current is 90% of the previous current or 80% of the previous current or some other percentage of the previous current less than 100%.

At block 620, a new determination of the transmission power is made, possibly in a manner similar to the manner in which the transmission power was determined at block 606. Transmission power in one block may be referred to as a first wireless transmission of power and transmission of power in another block may be referred to as a second wireless transmission of power. For example, the base station may operate during one time interval at the voltage and current of block 606 to produce a first wireless transmission of power to the mobile device, and the base station may later operate during another time interval at the voltage and current indicated by block 620 to produce a second wireless transmission of power to the mobile device. At block 622, a new determination of the reception power is made, possibly in a manner similar to the manner in which the reception power was determined at block 608. At block 624, a new calculation of the power loss is performed based on the new values of transmission power and reception power. At block 626, a change in the power loss is calculated by subtracting the newly calculated power loss from the power loss that was stored at block 616. Alternatively, the change in the power loss may be calculated by determining a ratio of the newly calculated power loss to the power loss that was stored at block 616; by determining a percentage by which the power loss changed; by determining a first ratio of power received by the mobile device to power transmitted by the base station, determining a second ratio of power received by the mobile device to power transmitted by the base station after a decrease in transmission power, and determining a third ratio of the second ratio to the first ratio; or in some other manner.

At block 628, it is determined whether a percentage change in power loss may be explained by a corresponding percentage change in current in the transmission coil that was made at block 618. For example, if the transmission current is decreased to 90% of its previous value at block 618, it is determined whether the power loss determined at block 626 is approximately 90% of the loss determined in block 610. Such an equality of percentages may indicate that the power loss is due to the presence of a foreign object on the base station rather than to magnetic saturation. That is, if a foreign object is present on the base station and magnetic saturation is not occurring, the percentage decrease in power loss will typically be approximately equal to the percentage by which the transmission current was decreased, since the device will be in the non-saturation region 550 of FIG. 5 in such a case.

Stated another way, the current in the transmission coil may be reduced by a fixed percentage, say x percent, in block 618 and the resulting power loss may be computed in block 624. In block 628, the original power loss, denoted as "Loss" in FIG. 6, may be compared against the new power loss, denoted as "$Loss_{new}$" in FIG. 6, to determine if the change in power loss is linear or non-linear as a function of current in the transmission coil. If $Loss_{new}$ is approximately x percent less than Loss, (i.e., power loss is reduced in the same proportion as current is reduced), then the change in power loss is linear versus current, which would indicate the presence of a foreign object. Otherwise, the change is non-linear and therefore one of the devices (i.e., either the base station or the mobile device being charged) is in magnetic saturation. More specifically, the percentage change in loss may computed. Suppose the percentage change in power loss is represented as y. If y is not equal to x, within a defined margin of error (for example, within 10% or some other percentage of x), then it is determined that magnetic saturation occurred in either the base station or the mobile device.

If it is determined at block 628 that the percentage change in power loss is approximately equal to the percentage by which the transmission current was decreased (e.g., the percentage change in power loss is equal to the percentage change in current, within a defined margin of error), then at block 630, it is established that the power loss is due to a foreign object. At block 632, charging of the device is then disabled.

If it is determined at block 628 that the percentage change in power loss is not approximately equal to the percentage by which the transmission current was decreased (e.g., the percentage change in power loss is not equal to the percentage change in current, within the defined margin of error), then at block 634, it is established that magnetic saturation is occurring in the transmission coil or the reception coil. That is, an inequality between the percentage in which the transmission current was decreased and the percentage in which the power loss changed indicates that the base station or the device being charged is in the saturation region 560 of FIG. 5. Block that include calculations and/or decision logic, such as blocks 624, 626, and 628, may be performed in a communications and control unit, such as the communications and control unit 365, which may include a processor and a memory as described earlier.

Figure 7:
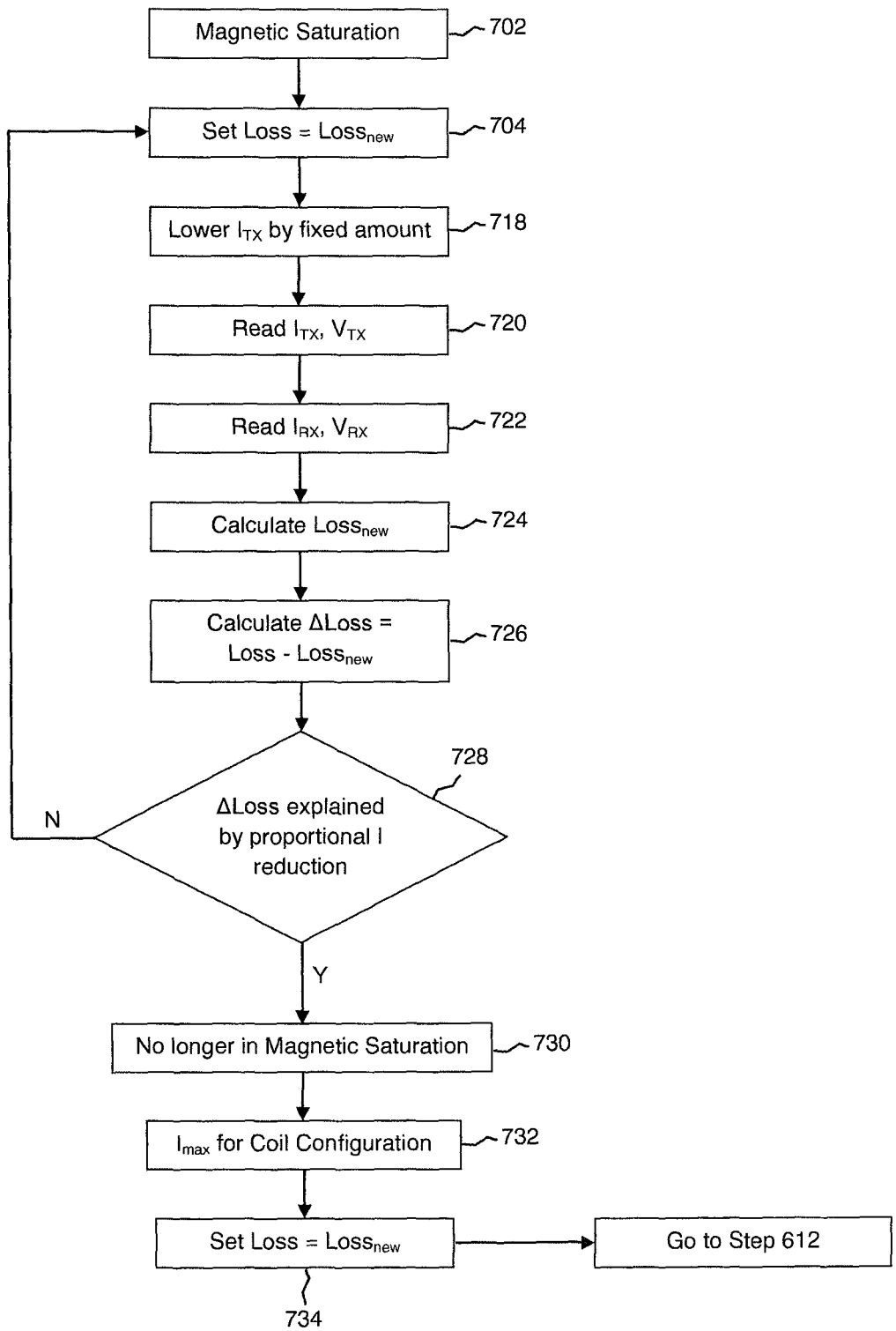
FIG. 7 is a flowchart of a procedure for responding to magnetic saturation in a wireless charging system, according to an embodiment of the disclosure.

FIG. 7 illustrates an embodiment of a procedure that may be followed when the procedure of FIG. 6 establishes that magnetic saturation is occurring. Thus, block 702 of FIG. 7 may be equivalent to block 634 of FIG. 6. It is again assumed that a base station, such as the base station 360, is charging a mobile device, such as the mobile device 350, but the procedure of FIG. 7 may also apply to a scenario where one mobile device is charging another mobile device.

At block 704, the most recently calculated power loss is stored. At block 718, the current in the transmission coil may be decreased by a fixed absolute amount or a fixed percentage, for example resulting in a value that is 80% or 90% of its previous value. At block 720, a new determination of the transmission power is made. At block 722, a new determination of the reception power is made. At block 724, a new calculation of the power loss is performed based on the new values of transmission power and reception power. At block 726, a change in the power loss is calculated by subtracting the newly calculated power loss from the power loss that was stored at block 704. Alternatively, the change in the power loss may be calculated by determining a ratio of the newly calculated power loss to the power loss that was stored at block 616; by determining a percentage by which the power loss changed (e.g., the change in loss divided by the original loss); by determining a first ratio of power received by the mobile device to power transmitted by the base station, determining a second ratio of power received by the mobile device to power transmitted by the base station after a decrease in transmission power, and determining a third ratio of the second ratio to the first ratio; or in some other manner.

At block 728, it is determined whether the change in power loss may be explained by a proportional change in current in the transmission coil that was made at block 718. For example, if the transmission current is decreased to 90% of its previous value at block 718, it is determined whether the power loss also decreased to approximately 90% of the previous value.

If it is determined that the percentage decrease in power loss is not approximately equal to the percentage by which the transmission current was decreased, then it is established that magnetic saturation is still occurring. The procedure then returns to block 704, and the steps in blocks 704 through 728 are repeated until it is determined at block 728 that the percentage decrease in power loss is approximately equal to percentage decrease in transmission current. For example, the percentage decrease in power loss may be equal to the percentage decrease in transmission current, within a defined margin of error (say within 10% error or some other percentage error).

At block 730, it is then established that magnetic saturation is no longer occurring. At block 732, it is established that the most recent value of the current in the transmission coil is the maximum current that should be allowed for the present transmission coil and reception coil configuration. At block 734, the most recent value of the power loss is maintained as the power loss for future calculations. The procedure then returns to block 612 of FIG. 6. Blocks that include calculations and/or decision logic, such as blocks 724, 726, and 728, may be performed in a communications and control unit, such as the communications and control unit 365, which may include a processor and a memory as described earlier.

At this point, it has been established only that magnetic saturation is no longer occurring. As mentioned above, it is possible that a foreign object may be present on the base station and that excessive heating of the foreign object may occur at the present level of transmission power. Thus, at block 612 of FIG. 6, it is again determined whether the power loss exceeds the threshold. If the power loss is below the threshold then, at block 614, charging continues. If the power loss is above the threshold, the procedures in blocks 616 through 628 may be followed. Since it was already established at block 730 of FIG. 7 that magnetic saturation is no longer occurring, the path to block 634 is not followed and the procedure proceeds to block 630, where it is established that a foreign object is present. Charging is then disabled at block 632. Alternatively, if it is determined at block 612 of FIG. 6 that the power loss exceeds the threshold, the procedure may bypass blocks 616 through 628 and proceed directly to block 630, since it has already been established that magnetic saturation is not occurring.

In other words, at block 702 of FIG. 7, a coil is in the saturation region 560 of FIG. 5. In blocks 704 through 728, the current in the transmission coil of the base station is decreased in successive increments, thus causing movement to the left within the saturation region 560. The incremental decreases in current continue until the knee region 570 is passed and the non-saturation region 550 is entered. It may be determined that the non-saturation region 550 has been entered when the percentage change in power loss is approximately equal to the percentage change in transmission current.

It may be desirable to maintain a current in the transmission coil that provides a location within the non-saturation region 550 that is close to the knee region 570. In such a location, the charging current, and thus the rate of charging, may be set near an optimum without magnetic saturation occurring. In some embodiments, such a location may be reached by decreasing the transmission current by relatively small increments, thus moving to the left in the curve, until it becomes apparent that the knee region 570 has just been passed.

In other embodiments, such a location may be reached by lowering the transmission current by relatively larger increments until it becomes apparent that the non-saturation region 550 has been entered. The transmission current may then be increased by relatively smaller increments, thus moving to the right in the curve, until it becomes apparent that the knee region 570 is being approached. Thus, these embodiments allow an appropriate charging current to be determined even when the magnetic characteristics of the coils in the charging device and the device being charged are not known. As mentioned above, it may be desirable to ensure that a foreign object is not present on the base station before maintaining this current as the charging current.

In the above discussion, it has been assumed that a mobile device, such as a mobile telephone, is being wirelessly charged by a fixed base station. However, in some cases, both the charging component and the component being charged may be mobile devices. For example, a mobile telephone may be used to wirelessly charge a wireless headset. In such cases, the coil in the mobile device that is typically used as a secondary or reception coil is instead used as a primary or transmission coil. Thus, as used herein, terms such as "inductive wireless charging component" or "wireless charger" may refer to any component capable of performing inductive wireless charging, regardless of whether the component is a fixed base station or mobile device.

The embodiments disclosed herein for avoiding magnetic saturation may be particularly valuable in scenarios where the coil in a mobile device that typically acts as a reception coil has a dual use as a transmission coil to allow charging of other products via the mobile device. The coil in a mobile device is typically much smaller than the coil in a base station, and the coil in a component being charged by a mobile device may be smaller still. Thus, magnetic saturation may be more likely to occur when a mobile device is used to charge another component.

The embodiments disclosed herein may assure that a configuration of a transmission coil and a reception coil can achieve maximum charge current to reduce charge time, while avoiding magnetic saturation and still being compliant with foreign object detection. The maximum current through a coil is limited by the coil's construction. The embodiments disclosed herein may assure a maximum charging current while avoiding saturation, even when the characteristics of a coil's construction are not known beforehand.

The following is incorporated herein by reference for all purposes: System Description Wireless Power Transfer, Volume 1: Low Power, Part 1: Interface Definition, Version 1.1.2, June 2013, published by the Wireless Power Consortium.

In an embodiment, a method is provided for optimizing wireless charging of a first device by a second device. The first device may be a mobile device, and the second device may be a wireless charger. The method comprises determining whether magnetic saturation occurred in at least one of the first device and the second device during a first wireless transmission of power from the second device to the first device; and, when magnetic saturation is determined to have occurred, successively reducing transmit power in the second device until reaching an operating wireless transmit power, wherein neither the first device nor the second device is in magnetic saturation at the operating wireless transmit power.

In another embodiment, a method is provided for determining if magnetic saturation has occurred in a first device being wirelessly charged by a second device. The first device may be a mobile device, and the second device may be a wireless charger. The method comprises determining a first amount of power loss in a first wireless transmission of power to the first device; when the first amount of power loss is greater than a threshold, determining a second amount of power loss in a second wireless transmission of power to the first device, wherein the power of the second wireless transmission is reduced by a first proportion relative to the power of the first wireless transmission; determining a first ratio of the first amount of power loss and the second amount of power loss; and when the first ratio is not equal, within a defined margin of error, to the first proportion, determining that magnetic saturation has occurred in the first device.

In another embodiment, a wireless charger is provided. The wireless charger comprises a primary coil and a processor coupled to the primary coil. The processor is configured to: determine whether magnetic saturation occurred in at least one of the primary coil and a mobile device being charged by the wireless charger during a first wireless transmission of power from the wireless charger to the mobile device; and when magnetic saturation is determined to have occurred, successively reducing current in the coil until reaching an operating wireless transmit power, wherein neither the primary coil nor the mobile device is in magnetic saturation at the operating wireless transmit power.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for optimizing wireless charging of a mobile device by a wireless charger, the method comprising:
    determining whether a first power loss for a first wireless transmission of power from the wireless charger to the mobile device exceeds a threshold;
    determining whether magnetic saturation occurred in at least one of the mobile device and the wireless charger during the first wireless transmission of power from the wireless charger to the mobile device in response to a determination that the first power loss exceeds the threshold; and
    when magnetic saturation is determined to have occurred, successively reducing transmit power in the wireless charger until reaching an operating wireless transmit power, wherein neither the mobile device nor the wireless charger is in magnetic saturation at the operating wireless transmit power.

2. The method of claim 1, wherein the first power loss is a difference between the operating wireless transmit power and a power induced in the mobile device by the wireless charger at the operating wireless transmit power, the method further comprising when the first power loss exceeds the threshold:
    determining that a foreign object is present on at least one of the wireless charger and the mobile device; and
    disabling charging by the wireless charger.

3. The method of claim 1, wherein determining whether magnetic saturation occurred comprises determining that magnetic saturation has occurred when a percentage difference between the first power loss and a second power loss is not equal to a fixed percentage within a defined margin of error, wherein the second power loss is determined for a second wireless transmission of power, and wherein a power measured in the wireless charger during the second wireless transmission of power is the fixed percentage less than a power measured in the wireless charger during the first wireless transmission of power.

4. The method of claim 3, wherein the first power loss is a difference between the power measured in the wireless charger during the first wireless transmission of power and a power induced in the mobile device by the wireless charger during the first wireless transmission of power, and wherein the second power loss is a difference between the power measured in the wireless charger during the second wireless transmission of power and a power induced in the mobile device by the wireless charger during the second wireless transmission of power.

5. The method of claim 3, further comprising when the percentage difference is equal to the fixed percentage within the defined margin of error, determining that a foreign object is present between the wireless charger and the mobile device.

6. The method of claim 1, wherein the transmit power in the wireless charger is successively reduced until reaching the operating wireless transmit power by decreasing a current in a coil in the wireless charger.

7. The method of claim 1, further comprising when the first power loss does not exceed the threshold:
    determining that a foreign object is not present; and
    maintaining the operating wireless transmit power.

8. A method for optimizing wireless charging of a mobile device by a wireless charger, the method comprising:
    determining whether magnetic saturation occurred in at least one of the mobile device and the wireless charger during a first wireless transmission of power from the wireless charger to the mobile device based on a percentage difference between a first power loss and a second power loss, wherein the first power loss is determined for the first wireless transmission of power from the wireless charger to the mobile device, wherein the second power loss is determined for a second wireless transmission of power from the wireless charger to the mobile device; and
    when magnetic saturation is determined to have occurred, successively reducing transmit power in the wireless charger until reaching an operating wireless transmit power, wherein neither the mobile device nor the wireless charger is in magnetic saturation at the operating wireless transmit power.

9. The method of claim 8, wherein the power of the second wireless transmission is reduced by a fixed percentage relative to the power of the first wireless transmission, the method further comprising, when the percentage difference is equal to the fixed percentage within the defined margin of error, determining that a foreign object is present on at least one of the wireless charger and the mobile device.

10. The method of claim 8, wherein the power of the second wireless transmission is reduced by the fixed percentage relative to the power of the first wireless transmission by decreasing a current in a coil in the wireless charger.

11. The method of claim 8, further comprising, when magnetic saturation has occurred, determining a third power loss in a third wireless transmission of power to the mobile device, wherein the power of the third wireless transmission is reduced by a second fixed percentage relative to the power of the second wireless transmission.

12. The method of claim 11, further comprising:
determining a second percentage difference between the second power loss and the third power loss; and
when the second percentage difference is equal to the second fixed percentage within the defined margin of error, determining that neither the mobile device nor the wireless charger is in magnetic saturation.

13. The method of claim 12, further comprising, when neither the mobile device nor the wireless charger is in magnetic saturation:
comparing the third power loss to a threshold;
when the third power loss does not exceed the threshold, determining that no foreign object is present on at least one of the wireless charger and the mobile device; and
when the third power loss does not exceed the threshold, maintaining a current in a coil in the wireless charger at a level that was attained for the third wireless transmission.

14. The method of claim 12, further comprising, when the second percentage difference is not equal, within the defined margin of error, to the second fixed percentage:
determining that at least one of the mobile device and the wireless charger is still in magnetic saturation; and
decreasing a current in a coil in the wireless charger by successive increments.

15. A wireless charger comprising:
a primary coil; and
a processor coupled to the primary coil and configured to:
determine whether magnetic saturation has occurred in at least one of the primary coil and a mobile device being charged by the wireless charger during a first wireless transmission of power from the wireless charger to the mobile device based on a percentage difference between a first power loss and a second power loss, wherein the first power loss is determined for the first wireless transmission of power from the wireless charger to the mobile device, wherein the second power loss is determined for a second wireless transmission of power from the wireless charger to the mobile device; and
successively reduce current in the primary coil until reaching an operating wireless transmit power when magnetic saturation has occurred in at least one of the primary coil and the mobile device, wherein neither the primary coil nor the mobile device is in magnetic saturation at the operating wireless transmit power.

16. The wireless charger of claim 15, wherein the processor is further configured to, when the first power loss exceeds a threshold:
determine that a foreign object is present between the wireless charger and the mobile device; and
disable charging by the wireless charger.

17. The wireless charger of claim 15, wherein a power measured in the wireless charger during the second wireless transmission of power is a fixed percentage less than a power measured in the wireless charger during the first wireless transmission of power, and wherein the processor is further configured to determine that magnetic saturation has occurred when the percentage difference is not equal to the fixed percentage within a defined margin of error.

18. The wireless charger of claim 15, wherein the first power loss is a difference between the power measured in the wireless charger during the first wireless transmission of power and a power induced in the mobile device by the wireless charger during the first wireless transmission of power, and wherein the second power loss is a difference between the power measured in the wireless charger during the second wireless transmission of power and a power induced in the mobile device by the wireless charger during the second wireless transmission of power.

19. The wireless charger of claim 15, wherein a power measured in the wireless charger during the second wireless transmission of power is a fixed percentage less than a power measured in the wireless charger during the first wireless transmission of power, and wherein the processor is further configured to, when the percentage difference is equal to the fixed percentage within the defined margin of error:
determine that a foreign object is present between the wireless charger and the mobile device; and
disable charging by the wireless charger.

20. The wireless charger of claim 15, wherein a power measured in the wireless charger during the second wireless transmission of power is a fixed percentage less than a power measured in the wireless charger during the first wireless transmission of power, and wherein the processor is further configured to decrease a current in the primary coil to reduce the power measured in the wireless charger during the second wireless transmission of power by the fixed percentage relative to the power measured in the wireless charger during the wireless transmission of power.

\* \* \* \* \*